United States Patent
Molzahn et al.

(10) Patent No.: US 6,423,662 B1
(45) Date of Patent: Jul. 23, 2002

(54) INCIPIENT WETNESS METHOD FOR MAKING METAL-CONTAINING CYANIDE CATALYSTS

(75) Inventors: David C. Molzahn; William P. Dianis, both of Midland, MI (US)

(73) Assignee: Dow Global Technologies Inc., Midland, MI (US)

(*) Notice: Subject to any disclaimer, the term of this patent is extended or adjusted under 35 U.S.C. 154(b) by 0 days.

(21) Appl. No.: 09/574,844

(22) Filed: May 19, 2000

Related U.S. Application Data
(60) Provisional application No. 60/143,087, filed on Jul. 9, 1999.

(51) Int. Cl.$^7$ .............................. B01J 27/26; C01C 3/08; C01C 3/11
(52) U.S. Cl. .................. 502/175; 502/200; 423/365
(58) Field of Search .................. 502/175, 200; 423/365

(56) References Cited

U.S. PATENT DOCUMENTS

| | | | |
|---|---|---|---|
| 3,278,457 A | 10/1966 | Milgrom | |
| 3,829,505 A | 8/1974 | Herold | |
| 4,472,550 A | 9/1984 | Reiff et al. | 524/589 |
| 4,477,589 A | 10/1984 | Van Der Hulst et al. | 502/169 |
| 5,470,813 A | 11/1995 | Le-Khac | 502/175 |
| 5,482,908 A | 1/1996 | Le-Khac | 502/156 |
| 5,767,323 A | 6/1998 | Televantos et al. | 568/613 |
| 5,998,327 A | 12/1999 | Hofmann et al. | 502/175 |

FOREIGN PATENT DOCUMENTS

| | | |
|---|---|---|
| EP | 0 659 798 A | 6/1995 |
| EP | 0 755 716 A | 1/1997 |
| WO | WO 99 48607 A | 9/1999 |

OTHER PUBLICATIONS

J. Kuyper and G. Boxhoom, Hexacyanometallate Salts Used as Alkene–Oxide Polymerization Catalysts and Molecular Sieves, Journal of Catalysis 105, pp. 163–174, 1987 No Month.

*Primary Examiner*—Elizabeth D. Wood

(57) ABSTRACT

Metal cyanide catalysts are prepared by first forming a precipitate using no more than a stoichiometric amount of a water-soluble metal salt of the form $M_xA_y$, based on the amount of metal cyanide compound that is used. The precipitate is then treated with an additional quantity of a metal salt of the form $M^3_xA_y$, in which $M^3$ may be the same as or different than M. The catalyst is treated with a complexing agent, either during the precipitation step or during the subsequent treatment with the $M^3_xA_y$ salt.

23 Claims, No Drawings

US 6,423,662 B1

INCIPIENT WETNESS METHOD FOR MAKING METAL-CONTAINING CYANIDE CATALYSTS

CROSS-REFERENCE TO RELATED APPLICATION

This application is related to and claims priority under 35 USC §120 from U.S. Provisional Application No. 60/143,087, filed Jul. 9, 1999. That provisional application is hereby incorporated by reference in its entirety.

BACKGROUND OF THE INVENTION

This invention relates to certain metal-containing catalysts and to methods for preparing metal-containing catalysts for alkylene oxide polymerization.

Alkylene oxides such as ethylene oxide, propylene oxide and 1,2-butylene oxide are polymerized to form a wide variety of polyether products. For example, polyether polyols are prepared in large quantities for polyurethane applications. Other polyethers are used as lubricants, brake fluids, compressor fluids, and many other applications.

These polyethers are commonly prepared by polymerizing one or more alkylene oxides in the presence of an initiator compound and a catalyst. Recently, the so-called double metal cyanide (DMC) catalysts have been used commercially as polymerization catalysts for alkylene oxides. These catalysts are described, for example, in U.S. Pat. Nos. 3,278,457, 3,278,458, 3,278,459, 3,404,109, 3,427,256, 3,427,334, 3,427,335, 5,470,813 among many others. Although these catalysts are described very broadly in the patent literature, only a limited number of forms of the catalyst have been shown to be active alkylene oxide polymerization catalysts.

The active catalysts are typically prepared by mixing an excess of a water soluble salt of a metal M with a water soluble compound containing an anion of the type $M^1[(CN)_r(X)_t]$, in aqueous solution. An excess of the M salt is essential to produce an active catalyst. In addition, the active forms of the catalyst all require the presence of an organic complexing agent. In conventional processes, this is provided by either adding the complexing agent to one or both of the starting solutions or by separately adding the complexing agent immediately after mixing the starting solutions. A catalyst complex containing the insoluble $M_b[M^1(CN)_r(X)_t]_c$ associated with the complexing agent and bound water, precipitates and is washed, usually multiple times, with mixtures of the complexing agent and water.

The preparation method just described has several disadvantages. First, the variety of compositions that can be made is usually limited to those having a single type of M ion.

Second, because the salt of the metal M is water-soluble, at least a portion of the excess salt remains in the aqueous phase when the catalyst complex first precipitates. This salt is lost when the precipitated catalyst is isolated. Thus, some of the salt is wasted, and, unless the product is subsequently analyzed, it is often not known how much of the excess salt is incorporated into the catalyst. This can be important, as it is believed that the activity of the catalyst complex depends on the presence of an excess of the salt.

In addition, the preparation method described above uses much more of the complexing agent compound than actually becomes bound into the catalyst complex. This results in excess raw material costs and increases the overall cost of making the catalyst complex.

Thus, it would be desirable to provide a method by which controlled amounts of excess metal salt can be incorporated into a metal-containing cyanide catalyst. It would further be desirable to provide a less expensive method of making these metal-containing catalyst complexes, and to reduce the quantities of raw materials and the number of steps required to prepare these catalyst complexes.

SUMMARY OF THE INVENTION

In one aspect, this invention is a method for preparing a metal-containing catalyst, comprising the steps of:
 a) forming a first solution of a metal salt in water;
 b) forming a second aqueous solution of a metal cyanide compound or a mixture thereof with a supplementary compound having a transition metal-containing anion which forms an insoluble salt with the metal in said metal salt;
 c) mixing said first and second solutions in proportions such that no more than a stoichiometric quantity of the metal salt is present in the mixture, based on the number of equivalents of the metal cyanide compound and any supplementary compound present, under conditions such that the metal salt, the metal cyanide salt and the supplementary compound, if present, react to form an insoluble precipitate;
wherein step c) is performed in the presence of an organic complexing agent compound, step c) is followed by washing the insoluble precipitate with an organic complexing agent compound, or both, then
 d) removing excess water and any excess organic complexing agent from the insoluble precipitate to form an isolated precipitate; and
 e) mixing the isolated precipitate with an impregnating solution containing an additional quantity of a metal salt dissolved in water or a mixture of water and a soluble organic complexing agent, under conditions such that the impregnating solution is substantially absorbed by the isolated precipitate, wherein the concentration of the metal salt in the impregnating solution is such that about 0.1 to about 1.5 moles of metal salt are provided in said impregnating solution per mole of metal cyanide compound and transition metal-containing anion in the isolated precipitate.

The method of the first aspect of the invention provides a convenient way to make metal-containing catalyst complexes having a controlled content of excess metal salt. The method further avoids or minimizes losses of the metal salt during washing steps.

In another aspect, this invention is a method for preparing a metal-containing catalyst, comprising the steps of:
 a) forming a first solution of a metal salt in water;
 b) forming a second aqueous solution of a metal cyanide compound or a mixture thereof with a supplementary compound having a transition metal-containing anion which forms an insoluble salt with the metal in said metal salt;
 c) in the substantial absence of an organic complexing agent, mixing said first and second solutions in proportions such that no more than a stoichiometric quantity of the metal salt is present in the reaction mixture, based on the number of equivalents of the metal cyanide compound and any supplementary compound present, under conditions such that the metal salt, metal cyanide salt and supplementary compound, if present, react to form an insoluble precipitate;
 d) removing excess water from the insoluble precipitate to form an isolated precipitate e) mixing the isolated precipitate with an impregnating solution containing an additional quantity of a metal salt dissolved in a mixture of water and a soluble organic complexing agent, under conditions such that the impregnating solution is substantially absorbed by the isolated precipitate, wherein the concentration of the metal salt in the impregnating solution is such that about 0.1 to about 1.5 moles of metal salt are provided in said impregnating solution per mole of metal cyanide compound and transition metal-containing anion in the isolated precipitate.

This second aspect of the invention provides a method by which a highly active metal-containing cyanide catalyst can be prepared, using a reduced amount of organic complexing agent and with an easily controlled excess of the metal salt. The activity of this catalyst is particularly surprising because conventional preparation methods for metal-containing catalysts require the addition of copious amounts of complexing agent during the initial precipitation of the catalyst complex.

In addition, this method provides a convenient way to make specialized catalyst complexes, because different metal salts can be used to make the initial precipitate and in the impregnating solution.

In a third aspect, this invention is a method for preparing a metal-containing cyanide catalyst, comprising the steps of:

a) forming a first solution of a metal salt in water;

b) forming a second aqueous solution of a metal cyanide compound or a mixture thereof with a supplementary compound having a transition metal-containing anion which forms an insoluble salt with the metal in said metal salt;

c) mixing said first and second solutions in proportions such that no more than a stoichiometric quantity of the metal salt is present in the reaction mixture, based on the combined number of equivalents of the metal cyanide compound and supplementary compound, if any, under conditions such that the metal salt, metal cyanide salt and supplementary compound, if present, react to form an insoluble precipitate;

d) removing excess water from the insoluble precipitate to form an isolated precipitate; and e) mixing the isolated precipitate with an impregnating solution containing an additional quantity of a metal salt dissolved in a mixture of water and a soluble organic complexing agent, wherein the concentration of the metal salt in the impregnating solution is such that about 0.1 to about 1.5 moles of metal salt are provided in said impregnating solution per mole of metal cyanide compound and transition metal-containing anion in the isolated precipitate.

In yet another aspect, this invention is a metallic cyanide catalyst of the structure:

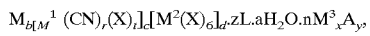

wherein M is a metal ion that forms an insoluble precipitate with the $M^1(CN)_r(X)_t$ group and which has at least one water soluble salt;

$M^1$ and $M^2$ are transition metal ions that may be the same or different;

X represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2; and z, n and a are positive numbers (which may be fractions) indicating the relative quantities of the complexing agent, water molecules and $M^3_xA_y$, respectively.

DETAILED DESCRIPTION OF THE INVENTION

The metal-containing cyanide catalyst of this invention can be represented by the general formula:

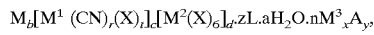

wherein M is a metal ion that forms an insoluble precipitate with the $M^1(CN)_r(X)_t$ group and which has at least one water soluble salt;

$M^1$ and $M^2$ are transition metal ions that may be the same or different;

each X independently represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2; and z, n and a are positive numbers (which may be fractions) indicating the relative quantities of the complexing agent, water molecules and $M^3_xA_y$, respectively.

The X groups in any $M^2(X)_6$ do not have to be all the same. The molar ratio of c:d is advantageously from about 100:0 to about 20:80, more preferably from about 100:0 to about 50:50, and even more preferably from about 100:0 to about 80:20.

The term "metal salt" is used herein to refer to a salt of the formula $M_xA_y$ or $M^3_xA_y$, where M, $M^3$, x, A and y are as defined above.

M and $M^3$ are preferably metal ions selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $P^{b+2}$, $Cu^{+2}$, $La^{+3}$ and $Cr^{+3}$. M and $M^3$ are more preferably $Zn^{+2}$, $Fe^{+2}$, $Co^{+2}$, $Ni^{+2}$, $La^{+2}$ and $Cr^{+3}$. M is most preferably $Zn^{+2}$.

Suitable anions A include halides such as chloride and bromide, nitrate, sulfate, carbonate, cyanide, oxalate, thiocyanate, isocyanate, perchlorate, isothiocyanate, and a $C_{1-4}$ carboxylate. Chloride ion is especially preferred.

The term "metal cyanide compound" is used herein to refer to a compound as represented by the structure $B_u[M^1(CN)_r(X)_t]_v$, where B represents hydrogen or a metal atom that forms a water soluble salt with the $M^1(CN)_r(X)_t$ group, u and v are integers that reflect an electrostatically neutral salt, and $M^1$, r, X and t are as defined before. B is preferably hydrogen or an alkali metal such as lithium, potassium, sodium or cesium.

The term "supplementary compound" is used herein to refer to a compound having the general structure $B_u[M^2(X)_6]_v$, where B, $M^2$, X, u and v are as defined before. The use of a supplementary compound is optional in this invention.

$M^1$ and $M^2$ are preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$.

Among the foregoing, those in the plus-three oxidation state are more preferred. $Co^{+3}$ and $Fe^{+3}$ are even more preferred and $Co^{+3}$ is most preferred.

Preferred groups X include anions such as halide (especially chloride), hydroxide, sulfate, $C_{1-4}$ carbonate, oxalate, thiocyanate, isocyanate, isothiocyanate, $C_{1-4}$ carboxylate and nitrite ($NO_2^-$) and uncharged species such as CO, $H_2O$ and NO. Particularly preferred groups X are NO, $NO_2^-$ and CO.

The catalyst is complexed with an organic complexing agent. A great number of complexing agents are potentially useful, although catalyst activity may vary according to the selection of a particular complexing agent. Examples of such complexing agents include alcohols, aldehydes, ketones, ethers, amides, nitriles, sulfides, and the like.

Suitable alcohols include monoalcohols and polyalcohols. Suitable monoalcohols include methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol, 1-t-butoxy-2-propanol and the like. Suitable monoalcohols also include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols.

Suitable polyalcohols include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside, and the like. Low molecular weight polyether polyols, particular those having an equivalent weight of about 350 or less, more preferably about 125–250, are also useful complexing agents.

Suitable aldehydes include formaldehyde, acetaldehyde, butyraldehyde, valeric aldehyde, glyoxal, benzaldehyde, toluic aldehyde and the like. Suitable ketones include acetone, methyl ethyl ketone, 3-pentanone, 2-hexanone and the like.

Suitable ethers include cyclic ethers such as dioxane, trioxymethylene and paraformaldehyde as well as acyclic ethers such as diethyl ether, 1-ethoxy pentane, bis(betachloro ethyl) ether, methyl propyl ether, diethoxy methane, dialkyl ethers of alkylene or polyalkylene glycols (such as ethylene glycol dimethyl ether, diethylene glycol dimethyl ether, triethylene glycol dimethyl ether and octaethylene glycol dimethyl ether), and the like.

Amides such as formamide, acetamide, propionamide, butyramide and valeramide are useful complexing agents. Esters such as amyl formate, ethyl formate, hexyl formate, propyl formate, ethyl acetate, methyl acetate, triethylene glycol diacetate and the like can be used as well. Suitable nitriles include acetonitrile, proprionitrile and the like. Suitable sulfides include dimethyl sulfide, diethyl sulfide, dibutyl sulfide, diamyl sulfide and the like.

Preferred complexing agents are t-butanol, 1-t-butoxy-2-propanol, polyether polyols having an equivalent weight of about 75–350 and dialkyl ethers of alkylene and polyalkylene glycols. Especially preferred complexing agents are t-butanol, 1-t-butoxy-2-propanol, polyether polyols having an equivalent weight of 125–250 and a dimethyl ether of mono-, di- or triethylene glycol. t-Butanol and glyme (1,2-dimethoxy ethane) are most preferred.

In addition, the catalyst complex contains a quantity of water that is bound into the crystalline lattice of the complex. Although the amount of bound water is difficult to determine, it is believed that this amount is from about 0.25 to about 3 moles of water per mole of $M^1$ and $M^2$ ions.

In the method of the first aspect of the invention, separate aqueous solutions of the metal salt and the metal cyanide compound are formed. The aqueous solutions may contain, in addition to the water and metal salt or metal cyanide compound, a quantity of a mineral acid or a buffer to adjust the pH of the solution in order to more readily dissolve the metal salt and metal cyanide compounds. In the first aspect of the invention, either or both of the solutions may contain an organic complexing agent or a polyether compound, as described before.

In this first aspect, the solution of the metal salt and the solution of metal cyanide compound (optionally containing a supplementary compound) are then mixed with agitation at proportions such that no more than a stoichiometric quantity of the metal salt is provided, based on the equivalents of the metal cyanide compound (and supplementary compound, if present). The solutions can be mixed in any order. However, it is most preferred to add the solution of the metal cyanide compound to that of the metal salt. This tends to reduce the amount of undesirable ions that are trapped in the complex. By "stoichiometric quantity", it is meant that the metal salt is present in more than a 5 equivalent- % excess, preferably in no more than a 2 equivalent- % excess, more preferably in no more than a 1 equivalent- % excess, based on the amount of metal cyanide compound plus any supplementary compound. It is most preferred that the number of equivalents of metal salt be approximately equal to the number of equivalents of metal cyanide compound, plus any supplementary compound that may be present.

A precipitate forms when the solutions are mixed. The precipitate corresponds to the structure

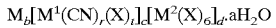

where M, $M^1$, X, a, b, c, d, r and t are as defined before. If one or both of the starting solutions contains an organic complexing agent, the precipitate will also contain a quantity of bound complexing agent molecules.

The resulting precipitate is then isolated from the water by filtration, centrifugation or other suitable process. In the first aspect of the invention, the precipitate is preferably washed one or more times with water to remove occluded ions such as those designated by B and X in the forgoing formulae. It is particularly preferred to remove any alkali metal and halide ions from the precipitated complex to as low a level as reasonably possible. In the method of the first aspect of the invention, if neither of the starting solutions contains an organic complexing agent, one or more of the subsequent washes must contain a quantity of the complexing agent. However, if the complexing agent is present in one or both of the starting solutions, its use is optional in the subsequent washings. When a complexing agent is used in the washes, it advantageously constitutes from about 10 to about 100 wt. % of the wash solution. A convenient method of performing the washes is to wash the precipitate multiple times, gradually increasing the complexing agent content of the wash solution, so that the final wash is 100 wt. % complexing agent.

The precipitate is then dried to remove excess water, and excess complexing agent if one or more of the washes also contains the complexing agent. This is conveniently done by heating the precipitate under vacuum at a somewhat elevated temperature, such as about 35 to about 95° C., preferably about 45–75° C., until the precipitate reaches a constant weight. The resulting product is the isolated precipitate.

The isolated precipitate is then impregnated with a solution of a metal salt, $M^3_xA_y$, in water. In the first aspect of the invention, this impregnating solution may also contain one or more complexing agent compounds. The impregnating solution may, if desired, also contain a polyether, especially a poly(propylene oxide) of up to about 4000 molecular weight. The impregnation is easily done with simple mixing at any convenient temperature, preferably about room temperature. Enough of the impregnating solution is used to deliver a sufficient amount of the metal salt to form an active catalyst complex. Typically, from about 0.1, preferably from about 0.25, to about 1.5, preferably to about 1.0, more preferably to about 0.75, moles of excess metal salt per mole of $M^1$ and $M^2$ ion is sufficient to form an active complex. When $M^3_xA_y$ is zinc chloride, these amounts correspond to about 9 to about 30, preferably about 11 to about 25, parts by weight of zinc chloride per 100 parts by weight of the isolated precipitate.

In addition, it is preferred that the amount does not exceed that amount of solution that can be substantially absorbed by the precipitate. The amount of the solution that can be absorbed will vary according to the chemical composition of the isolated precipitate and its porosity. A typical amount of solution to be used is from about 0.5 to about 2, preferably about 0.8 to about 1.5, more preferably about 1 to about 1.5, milliliters of solution per gram of isolated precipitate.

In the first aspect of the invention, the impregnating solution advantageously contains water and complexing agent in a weight ratio of about 100:0 to about 10:90, preferably about 90:10 to about 30:70.

Note that the metal salt used in the impregnating solution does not have to be the same metal salt that is used in the initial precipitation step. In particular, the respective metal salts may contain different metals. Thus, for example, a zinc salt may be used in the precipitation step, but a salt of lanthanum, chromium, iron or other metal can be used in the impregnation step. Because different metal salts can be used in the method of the invention, this method provides a method by which catalyst complexes can be tailored for specific applications.

After the isolated catalyst is mixed with the impregnating solution, the mixture typically has a thick, mud-like consistency.

The method of the first aspect of the invention provides the advantages of permitting control over the amount of excess metal salt introduced into the catalyst complex and in some instances reducing the quantity of metal salt that is needed.

The second aspect of the invention is similar, except that no complexing agent is introduced into the system until the impregnating solution is added to the isolated precipitate. That is, neither of the starting solutions contains an organic complexing agent, and preferably does not contain a polyether or other organic species, either. The precipitate that is formed from the starting solutions thereof is substantially free of organic complexing agent. Moreover, in the second aspect of the invention, the subsequent washings of the precipitate are done with a wash solution that is devoid of complexing agent, polyether polyol and other organic species, so that the isolated precipitate remains substantially devoid of those materials.

In the method of the second aspect, the impregnating solution contains, in addition to water and the metal salt, an amount of organic complexing agent and optionally a polyether or other desirable organic species. In this second aspect, the impregnating solution advantageously contains water and complexing agent in a weight ratio of about 90:10 to about 10:90, preferably about 70:30 to about 30:70. As before, it is preferred that no more solution is used than can be substantially absorbed by the isolated precipitate.

The method of the second aspect provides the additional advantages of substantially reducing the amount of complexing agent that is used in the process, and of simplifying the catalyst preparation. Like the method of the first aspect, the method of the second aspect provides for controlled introduction of predetermined amounts of excess metal salts into the catalyst complex.

In either aspect of the invention, the impregnated catalyst is preferably permitted to sit at approximately ambient conditions (room temperature, atmospheric pressure) for a period to permit the metal salt and complexing agent to become bound into the catalyst complex. This process is typically completed in a few hours at ambient conditions. If desired, slightly elevated temperatures and/or slightly decreased pressures may be applied to accelerate the process. Then, the catalyst preferably is dried under vacuum and/or more elevated temperatures to complete the drying process.

Further, in either aspect of the invention, the impregnation step can be carried out in two or more stages. Thus, after a first impregnation step is performed, the complexing agent is allowed to become bound into the complex, and the complex dried, as before. Then, a second impregnation step is performed and the impregnated catalyst worked up and dried as described before. Further impregnation steps can be done in similar manner. The use of multiple impregnations is desirable when a high loading of the $M^3_xA_y$ salt is desired, or when the $M^3_xA_y$ is not highly soluble in the impregnating solution.

Preferred catalysts that can be prepared by the methods of the invention include:

Zinc hexacyanocobaltate.$zL.aH_2O.nZnCl_2$;
$Zn[Co(CN)_5NO].zL.aH_2O.nZnCl_2$;
$Zn_s[Co(CN)_6]_o[Fe(CN)_5NO]_p.zL.aH_2O.nZnCl_2$ (o, p=positive numbers, s=1.5o+p);
$Zn_s[Co(CN)_6]_o[Co(NO_2)_6]_p[Fe(CN)_5NO]_q.zL.aH_2O.nZnCl_2$ (o, p, q=positive numbers, s=1.5(o+p)+q);
Zinc hexacyanocobaltate.$zL.aH_2O.nLaCl_3$;
$Zn[Co(CN)_5NO].zL.aH_2O.nLaCl_3$;
$Zn[Co(CN)_6]_o[Fe(CN)_5NO]_p.zL.aH_2O.nLaCl_3$ (o, p=positive numbers, s=1.5o+p);
$Zn_s[Co(CN)_6]_o[Co(NO_2)_6]_p[Fe(CN)_5NO]_q.zL.aH_2O.nLaCl_3$ (o, p, q=positive numbers, s=1.5(o+p)+q);
Zinc hexacyanocobaltate.$zL.aH_2O.nCrCl_3$;
$Zn[Co(CN)_5NO].zL.aH_2O.nCrCl_3$;
$Zn_s[Co(CN)_6]_o[Fe(CN)_5NO]_p.zL.aH_2O.nCrCl_3$ (o, p=positive numbers, s=1.5o+p);
$Zn_s[Co(CN)_6]_o[Co(NO_2)_6]_p[Fe(CN)_5NO]_q.zL.aH_2O.nCrCl_3$ (o, p, q=positive numbers, s=1.5(o+p)+q);
Magnesium hexacyanocobaltate.$zL.aH_2O.nZnCl_2$;
$Mg[Co(CN)_5NO].zL.aH_2O.nZnCl_2$;
$Mg_s[Co(CN)_6]_o[Fe(CN)_5NO]_p.zL.aH_2O.nZnCl_2$ (o, p=positive numbers,s=1.50+p);
$Mg_s[Co(CN)_6]_o[Co(NO_2)_6]_p[Fe(CN)5NO]_q.zL.aH_2O.nZnCl_2$ (o, p, q=positive numbers, s=1.5(o+p)+q);
Magnesium hexacyanocobaltate.$zL.aH_2O.nLaCl_3$;
$Mg[Co(CN)_5NO].zL.aH_2O.nLaCl_3$;
$Mg_s[Co(CN)_6]_o[Fe(CN)_5NO]_p.zL.aH_2O.nLaCl_3$ (o, p=positive numbers, s=1.5o+p);

$Mg_s[Co(CN)_6]_o[Co(NO_2)_6]_p[Fe(CN)_5NO]_q.zL.aH_2O.nLaCl_3$
(o, p, q=positive numbers, s=1.5(o+p)+q);
Magnesium hexacyanocobaltate.$zL.aH_2O.nCrCl_3$;
$Mg[Co(CN)_5NO].zL.aH_2O.nCrCl_3$;
$Mg_s[Co(CN)_6]_o[Fe(CN)_5NO]_p.zL.aH_2O.nCrCl_3$ (o, p=positive numbers, s=1.5o+p);
$Mg_s[Co(CN)_6]_o[Co(NO_2)_6]_p[Fe(CN)_5NO]_q.zL.aH_2O.nCrCl_3$
(o, p, q=positive numbers, s=1.5(o+p)+q); as well as the various complexes such as are described at column 3 of U.S. Pat. No. 3,404,109, incorporated herein by reference.

The catalyst complex of the invention is used to polymerize alkylene oxides to make polyethers. In general, the process includes mixing a catalytically effective amount of the catalyst with an alkylene oxide under polymerization conditions, and allowing the polymerization to proceed until the supply of alkylene oxide is essentially exhausted. The concentration of the catalyst complex is selected to polymerize the alkylene oxide at a desired rate or within a desired period of time. The amount of catalyst complex is conveniently expressed in terms of its weight in parts per million of the product polyether. The weight of the product polyether is itself generally regarded as the combined weight of initiator plus monomers. Thus, a suitable amount of catalyst is from about 5 to about 10,000 parts by weight catalyst complex per million parts combined weight of alkylene oxide, and initiator and comonomers, if present. More preferred catalyst levels are from about 10, especially from about 25, to about 500, more preferably about 100 ppm, most preferably about 50 ppm, on the same basis.

For making high molecular weight monofunctional polyethers, it is not necessary to include an initiator compound. However, to control molecular weight, impart a desired functionality (number of hydroxyl groups/molecule) or a desired functional group, an initiator compound is preferably mixed with the catalyst complex at the beginning of the reaction. Suitable initiator compounds include monoalcohols such methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol and the like. Suitable monoalcohol initiator compounds include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol and 1-t-butoxy-2-propanol as well as nitroalcohols, keto-alcohols, ester-alcohols, cyanoalcohols, and other inertly substituted alcohols. Suitable polyalcohol initiators include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside and the like. However, the catalyst tends to perform better when the initiator is a polyether polyol, particularly one having an equivalent weight of about 350 or less, more preferably about 125–250.

Among the alkylene oxides that can be polymerized with the catalyst complex of the invention are ethylene oxide, propylene oxide, 1,2-butylene oxide, styrene oxide, and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 50 weight % propylene oxide and up to about 50 weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109 and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

The polymerization reaction typically proceeds well at temperatures from about 25 to about 150° C. or higher, preferably from about 90–130° C. A convenient polymerization technique involves mixing the catalyst complex and initiator, and pressuring the reactor with the alkylene oxide. Polymerization proceeds after a short induction period, as indicated by a loss of pressure in the reactor. Induction periods of from less than one minute to about 20 minutes are commonly seen, and induction periods are often less than 15 minutes. Once the polymerization has begun, additional alkylene oxide is conveniently fed to the reactor on demand, until enough alkylene oxide has been added to produce a polymer of the desired equivalent weight.

Another convenient polymerization technique is a continuous method. In such continuous processes, an activated initiator/catalyst mixture is continuously fed into a continuous reactor such as a continuously stirred tank reactor (CSTR) or a tubular reactor. A feed of alkylene oxide is introduced into the reactor and the product continuously removed.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably about 4000, more preferably to about 2500, and unsaturation of no more than 0.02 meq/g, preferably no more than about 0.01 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated.

EXAMPLE 1

A. Catalyst Preparation

A solution of zinc chloride (4.937 parts) in water (100.813 parts) and HCl (added as eight drops of 1 M HCl) is prepared.

A second solution of 8.018 parts $K_3Co(CN)_6$ in 157.86 parts of water is prepared. The molar ratio of $ZnCl_2$ to $K_3Co(CN)_6$ in the two solutions is 3:2.

The zinc chloride solution is placed in a container equipped with a stirrer, and the $K_3Co(CN)_6$ solution is pumped into it at the rate of 2 ml/minute. A precipitate of $Zn_3[Co(CN)_6]_2$ forms. The mixture is centrifuged until a clear supernatant liquid can be poured off. The recovered precipitate is washed five times with about 150 parts water, and centrifuged. The centrifuged precipitate is then dried in a vacuum oven (0.5 torr, 65° C.) overnight. The resulting product is referred to below as Stoichiometric Precipitate A.

An impregnating solution is prepared by dissolving 0.3 parts zinc chloride in 2.242 parts of a 50/50 by weight mixture of t-butanol and deionized water. This solution is used to impregnate 1.5 parts of stoichiometric Precipitate A. The impregnation is performed by mixing Stoichiometric Precipitate A and the impregnating solution and allowing them to stand at room temperature for about 90 minutes, followed by drying under vacuum (0.5 torr, 65° C.) for about 2.5 hours. The resulting product is designated Catalyst Complex 1.

B. Propylene Oxide Polymerization

The activity of Catalyst Complex 1 is evaluated by combining 0.0405 parts of it with 10.3 parts of an initiator (a nominally trifunctional, 700 molecular weight poly (propylene oxide)), and then reacting this mixture with propylene oxide. The catalyst and initiator are charged to a suitable reactor, and the reactor is purged with nitrogen. It is then heated to 110° C. and pressurized to 40 psig with propylene oxide. Propylene oxide is then fed on demand, limited by the feed pump rate, until about 29 parts of propylene oxide have been fed. An induction period of 25 minutes is seen at the start of the reaction, at which point an exotherm occurs followed by rapid polymerization of the remaining propylene oxide.

EXAMPLE 2

Catalyst Complex 2 is made by mixing 1.02 parts of Stoichiometric Precipitate A and 1.18 parts of a solution made by dissolving 0.248 parts $FeCl_3$ in 1.76 g parts of a 50/50 by weight mixture of t-butanol in water. The mixture is permitted to stand at room temperature and then dried in the manner described in Example 1.

Catalyst Complex 2 is evaluated for activity in the manner described in Example 1. It polymerizes about 29 parts of propylene oxide in about 8 hours.

EXAMPLE 3

Catalyst Complex 3 is made by mixing 1.029 parts of Stoichiometric Precipitate A and 1.62 parts of a solution made by dissolving 0.253 parts $LaCl_3$ in 1.747 g parts of a 50/50 by weight mixture of t-butanol in water. The mixture is permitted to stand at room temperature and then dried in the manner described in Example 1.

Catalyst Complex 3 is evaluated for activity in the same manner described in Example 1. An induction period of 42 minutes is seen at the start of the reaction, at which point an exotherm occurs, followed by rapid polymerization of the remaining propylene oxide.

EXAMPLE 4

Catalyst Complex 4 is made by mixing 1.044 parts of Stoichiometric Precipitate A and 2.026 parts of a solution made by dissolving 0.248 parts $CrCl_3 \cdot 6H_2O$ in 1.778 g parts of a 50/50 by weight mixture of t-butanol in water. The mixture is permitted to stand at room temperature and then dried in the manner described in Example 1.

Catalyst Complex 4 is evaluated for activity in the same manner described in Example 1. An induction period of 20 minutes is seen at the start of the reaction, at which point an exotherm occurs, followed by rapid polymerization of the remaining propylene oxide.

EXAMPLE 5

1.008 parts of Stoichiometric Precipitate A, 0.209 parts $Mg(OH)_2$ and about 20 parts water are mixed and agitated at room temperature for about 3 days in order to exchange a part of the zinc ions in the precipitate with magnesium ions. The mixture is then centrifuged to remove solids. The liquid phase is recovered, and the water evaporated at room temperature. A solid (0.615 parts), which is believed to contain $Mg_3[Co(CN)_6]_2$, is recovered. This precipitate is Stoichiometric Precipitate B.

An impregnating solution is prepared by mixing 0.161 parts of zinc chloride in 1.116 parts of a 50/50 by weight mixture of t-butanol and water. Stoichiometric Precipitate B is impregnated with this impregnating solution, dried at room temperature and then in a vacuum oven (0.5 torr, 65° C.) to approximately constant dryness. The product is designated Catalyst Complex 5.

Catalyst Complex 5 is evaluated for activity in the same manner described in Example 1. An induction period of 87 minutes is seen at the start of the reaction, at which point an exotherm occurs, followed by rapid polymerization of the remaining propylene oxide.

EXAMPLE 6

Catalyst Complex 6 is made by mixing 0.5 parts of Stoichiometric Precipitate A and 0.50 parts of a solution made by dissolving 0.22 parts zinc chloride in 1.00 parts of a 50/50 by volume mixture of t-butanol in water. The mixture is permitted to stand at room temperature and then dried in the manner described in Example 1.

Catalyst Complex 6 is evaluated for activity by adding 0.04 parts of the catalyst and 9.88 parts of a nominally trifunctional, 700 molecular weight poly(propylene oxide) to a small reactor. The reactor is heated to 110° C. and pressurized to 40 psig with propylene oxide. Propylene oxide is then fed to the reactor on demand until 33 parts have been consumed. The reaction mixture is then transferred to a larger stirred vessel, heated to 110° C. and pressurized to 40 psig with propylene oxide. Propylene oxide is then fed on demand until 166 more parts of propylene oxide have been consumed. An induction period is seen at the start of the reaction, at which point an exotherm occurs, followed by rapid polymerization of the remaining propylene oxide. The product has a $M_n$ of 16,297, an $M_w$ of 27,045, a % OH of 0.39 and 0.013 meq/g of unsaturation.

EXAMPLE 7

Catalyst Complex 7 is made by mixing 0.5 part of Stoichiometric Precipitate A and 0.68 part of a solution made by dissolving 0.08 part zinc chloride in 0.6 part of a 50/50 by volume mixture of t-butanol in water. The mixture is permitted to stand at room temperature and then dried in the manner described in Example 1.

Catalyst Complex 7 is evaluated for activity in the same manner described in Example 1. An induction period of 76 minutes is seen at the start of the reaction, at which point an exotherm occurs, followed by rapid polymerization of the remaining propylene oxide.

EXAMPLE 8

Catalyst Complex 8 is made by slurrying 0.5 parts of Stoichiometric Precipitate A in 5 mL t-butanol. The slurry is stirred at room temperature for about one hour. Then, a solution of 0.2 parts zinc chloride in 1 mL of a 80/20 mixture of t-butanol in water is added. The mixture is permitted to stand at room temperature and then dried in the manner described in Example 1. A white powder is obtained.

Catalyst Complex 8 is evaluated for activity in the same manner described in Example 1. An induction period of 23 minutes is seen at the start of the reaction, at which point an exotherm occurs, followed by rapid polymerization of the remaining propylene oxide.

EXAMPLE 9

Catalyst Complex 9 is made by mixing 1.012 parts of Stoichiometric Precipitate A and 2.183 parts of a solution made by dissolving 0.292 parts zinc chloride in 2.266 parts of a 50/50 by weight mixture of glyme (1,2-dimethoxy ethane) in water. The mixture is permitted to stand at room temperature for about four hours and then dried under vacuum (0.5 torr) at about 65° C. for about 2 hours.

Catalyst Complex 9 is evaluated for activity in the same manner described in Example 1. An induction period of 49 minutes is seen at the start of the reaction, at which point an exotherm occurs, followed by rapid polymerization of the remaining propylene oxide.

EXAMPLE 10

8.0 parts of $K_3Co(CN)_6$ are dissolved in 150 parts water. A separate solution of 4.92 parts zinc chloride in 30 parts water is made. The solutions are mixed in a blender, followed by the addition of 130 parts of a 44/56 by weight solution of t-butanol in water. The product is centrifuged to isolate the precipitated solids. The isolated solids are mixed with 130 parts of a 64/36 by weight mixture of t-butanol and water and centrifuged again. The solids thus obtained are mixed with 77 parts t-butanol, centrifuged, and vacuum dried at 60° C.

1.25 parts of the dried solids are homogenized in 130 parts of a 44/56 t-butanol/water solution to form a slurry. 1.5 parts zinc chloride are dissolved in 5 parts water, added to the homogenized slurry and mixed at high speed for 3 minutes. The resulting slurry is centrifuged, and the solids are mixed with 130 parts of a 64/36 solution of t-butanol in water. The product is centrifuged, and the solids mixed with 77 parts t-butanol. The product is again centrifuged and vacuum dried at 60° C. for 6 hours to produce Catalyst Complex 10. Neutron activation analysis on Catalyst Complex 10 shows 25.6% zinc, 14.8% cobalt and 0.9% potassium.

Catalyst Complex 10 is evaluated for activity in the same manner described in Example 1. An induction period of 20 minutes is seen at the start of the reaction, at which point an exotherm occurs, followed by rapid polymerization of the remaining propylene oxide.

EXAMPLE 11

1.26 parts of Stoichiometric Precipitate A are treated with 0.54 parts of zinc chloride dissolved in 2 parts of water. The paste-like product is dried at room temperature for several hours, and then is vacuum dried at 0° C. and 0.5 torr to constant weight.

Catalyst Complex 11 is evaluated for activity in the same manner described in Example 1. An induction period of 33 minutes is seen at the start of the reaction, at which point an exotherm occurs, followed by rapid polymerization of the remaining propylene oxide.

EXAMPLE 12

0.996 part of Stoichiometric Precipitate A are treated with 0.103 parts of $LaCl_3$ dissolved in 1.995 parts of a 50/50 by weight mixture of water and t-butanol. The paste-like product is dried at room temperature for several hours. It is then reimpregnated with a solution of 0.075 part $LaCl_3$ in 0.700 part of a 50/50 by weight mixture of water and t-butanol.

The catalyst complex is then dried for two days at room temperature and vacuum dried at 140° C. and 0.5 torr for 30 hours. Catalyst Complex 11 is evaluated for activity and found to be an active catalyst for the polymerization of propylene oxide.

What is claimed is:

1. A method for preparing a metal-containing catalyst, comprising the steps of:
   a) forming a first solution of a metal salt in water;
   b) forming a second aqueous solution of a metal cyanide compound or a mixture thereof with a supplementary compound having a transition metal-containing anion which forms an insoluble salt with the metal in said metal salt;
   c) mixing said first and second solutions in proportions such that no more than a stoichiometric quantity of the metal salt is present in the mixture, based on the combined number of equivalents of the metal cyanide compound and any supplementary compound present, under conditions such that the metal salt, metal cyanide salt and the supplementary compound, if present, react to form an insoluble precipitate;
   wherein step c) is performed in the presence of an organic complexing agent compound, step c) is followed by washing the insoluble precipitate with an organic complexing agent compound, or both, then
   d) removing excess water and any excess organic complexing agent from the insoluble precipitate to form an isolated precipitate; and
   e) mixing the isolated precipitate with an impregnating solution containing an additional quantity of a metal salt dissolved in water or a mixture of water and a soluble organic complexing agent, under conditions such that the impregnating solution is substantially absorbed by the isolated precipitate, wherein the concentration of the metal salt in the impregnating solution is such that about 0.1 to about 1.5 moles of metal salt are provided in said impregnating solution per mole of metal cyanide compound and transition metal-containing anion in the isolated precipitate.

2. The method of claim 1, wherein the metal salt in the first solution is a zinc salt.

3. The method of claim 2, wherein the metal salt in the impregnating solution is a zinc salt.

4. The method of claim 2, wherein the metal salt in the impregnating solution is a chromium, iron or lanthanum salt.

5. The method of claim 2, wherein, in step e) from about 0.2 to about 1.5 moles of metal salt are added per mole of metal cyanide compound and supplementary compound that are used in step b).

6. The method of claim 5, wherein the metal cyanide compound is a water soluble hexacyanocobaltate compound.

7. The method of claim 6, wherein the supplementary compound is absent.

8. A method for preparing a metal-containing catalyst, comprising the steps of:
   a) forming a first solution of a metal salt in water;
   b) forming a second aqueous solution of a metal cyanide compound or a mixture thereof with a supplementary compound having a transition metal-containing anion which forms an insoluble salt with the metal in said metal salt;
   c) in the substantial absence of an organic complexing agent, mixing said first and second solutions in proportions such that no more than a stoichiometric quantity of the metal salt is present in the reaction mixture, based on the combined number of equivalents of the metal cyanide compound and any supplementary compound present, under conditions such that the metal salt, metal cyanide salt and supplementary compound, if present, react to form an insoluble precipitate;

d) removing excess water from the insoluble precipitate to form an isolated precipitate;

e) mixing the isolated precipitate with an impregnating solution containing an additional quantity of a metal salt dissolved in a mixture of water and a soluble organic complexing agent, under conditions such that the impregnating solution is substantially absorbed by the isolated precipitate, wherein the concentration of the metal salt in the impregnating solution is such that about 0.1 to about 1.5 moles of metal salt are provided in said impregnating solution per mole of metal cyanide compound and transition metal-containing anion in the isolated precipitate.

9. The method of claim 8, wherein the metal salt in the first solution is a zinc salt.

10. The method of claim 9, wherein the metal salt in the impregnating solution is a zinc salt.

11. The method of claim 9, wherein the metal salt in the impregnating solution is a chromium, iron or lanthanum salt.

12. The method of claim 9, wherein, in step e) from about 0.2 to about 1.5 moles of metal salt are added per mole of metal cyanide compound and supplementary compound that are used in step b).

13. The method of claim 12, wherein the metal cyanide compound is a water soluble hexacyanocobaltate compound.

14. The method of claim 13, wherein the supplementary compound is absent.

15. A method for preparing a metal-containing cyanide catalyst, comprising the steps of:

a) forming a first solution of a metal salt in water;

b) forming a second aqueous solution of a metal cyanide compound or a mixture thereof with a supplementary compound having a transition metal-containing anion which forms an insoluble salt with the metal in said metal salt;

c) mixing said first and second solutions in proportions such that no more than a stoichiometric quantity of the metal salt is present in the reaction mixture, based on the combined number of equivalents of the metal cyanide compound and supplementary compound, if any, under conditions such that the metal salt, metal cyanide salt and supplementary compound, if present, react to form an insoluble precipitate;

d) removing excess water from the insoluble precipitate to form an isolated precipitate; and e) mixing the isolated precipitate with an impregnating solution containing an additional quantity of a metal salt dissolved in a mixture of water and a soluble organic complexing agent, wherein the concentration of the metal salt in the impregnating solution is such that about 0.1 to about 1.5 moles of metal salt are provided in said impregnating solution per mole of metal cyanide compound and transition metal-containing anion in the isolated precipitate.

16. The method of claim 15, wherein the metal salt in the first solution is a zinc salt.

17. The method of claim 16, wherein the metal salt in the impregnating solution is a zinc salt.

18. The method of claim 16, wherein the metal salt in the impregnating solution is a chromium, iron or lanthanum salt.

19. The method of claim 16, wherein, in step e) from about 0.2 to about 1.5 moles of metal salt are added per mole of metal cyanide compound and supplementary compound that are used in step b).

20. The method of claim 19, wherein the metal cyanide compound is a water soluble hexacyanocobaltate compound.

21. The method of claim 20, wherein the supplementary compound is absent.

22. A metallic cyanide catalyst of the structure:

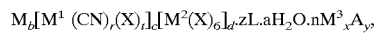

$$M_b[M^1(CN)_r(X)_t]_c[M^2(X)_6]_d \cdot zL \cdot aH_2O \cdot nM^3_xA_y,$$

wherein

M is a metal ion that forms an insoluble precipitate with the $M^1(CN)_r(X)_t$ group and which has at least one water soluble salt;

$M^1$ and $M^2$ are transition metal ions that may be the same or different;

X represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2; and z, n and a are positive numbers indicating the relative quantities of the complexing agent, water molecules and $M^3_xA_y$, respectively.

23. The metallic cyanide catalyst of claim 22, wherein M is a zinc ion, $M^1$ is $Co^{+3}$ or $Fe^{+3}$, d is zero and $M^3$ is a chromium, iron or lanthanum ion.

* * * * *